United States Patent
Hodge

[15] 3,661,427
[45] May 9, 1972

[54] BRAKING APPARATUS

[72] Inventor: Peter Charles Hodge, London, England

[73] Assignee: Simms Group Research and Development Limited, London, England

[22] Filed: Mar. 4, 1970

[21] Appl. No.: 16,286

[30] Foreign Application Priority Data

Mar. 6, 1969 Great Britain......................11,902/69

[52] U.S. Cl..............................303/21 F, 303/10, 303/40, 303/61

[51] Int. Cl. .........................................................B60t 8/06

[58] Field of Search ....................188/181; 303/21, 24, 6, 10, 303/61–63, 68–69, 40

[56] References Cited

UNITED STATES PATENTS

| | | | |
|---|---|---|---|
| 3,124,220 | 3/1964 | Kell................................... | 303/10 UX |
| 3,032,995 | 5/1962 | Knowles............................. | 303/10 X |
| 3,539,227 | 11/1970 | Drutchas et al..................... | 303/10 X |
| 3,524,684 | 8/1970 | Skoyles.............................. | 303/10 X |
| 3,514,162 | 5/1970 | Erlebach et al..................... | 303/10 X |

Primary Examiner—Milton Buchler
Assistant Examiner—John J. McLaughlin
Attorney—Watson, Cole, Grindle & Watson

[57] ABSTRACT

A braking system for a vehicle wheel which system comprises a reservoir, and a pump pumping liquid from the reservoir through a conduit and back to the reservoir in relation to the vehicle wheel speed. A progressively closable restriction is provided downstream of a connection to the brakes so liquid pressure upstream of the closable restriction may be increased to apply the brakes. A leakage conduit is provided to by-pass the closable restriction and the connection, and incorporates a variable restriction the opening of which increases with increased vehicle wheel speed.

7 Claims, 1 Drawing Figure

PATENTED MAY 9 1972 3,661,427
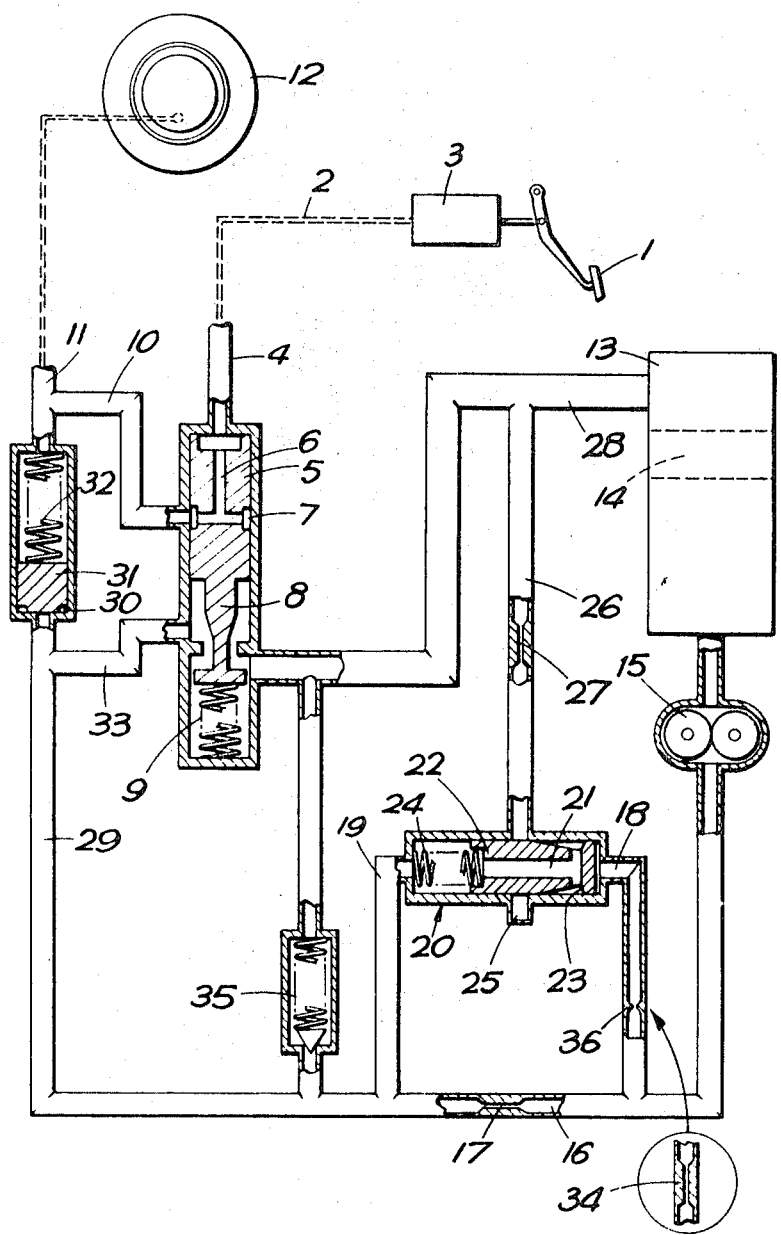
Inventor
Peter Charles Hodge
By Watson, Cole, Grindle & Watson

BRAKING APPARATUS

This invention relates to braking systems, and provides a vehicle braking system comprising brake operating means, a pump having a liquid throughput adapted to increase with wheel rotational speed and arranged to withdraw liquid from a reservoir and return it thereto after circulation through a conduit having a connection to the brake operating means, brake applying means located downstream of the connection and operable to add a restriction into the conduit and arranged so that the liquid pressure in the connection is increased, and a leakage path bypassing the brake applying means, the leakage path incorporating means providing a resistance to liquid flow which decreases automatically with increased wheel rotational speed.

The leakage path may comprise a variable restriction in series with a fixed restriction.

There may be provided means to sense the output provided by the liquid pump and means controlled by the sensing means to alter the variable restriction.

In the above arrangement, the means to sense the output of the liquid pump may comprise a further restriction in the main delivery path from the pump, and the altering means for the variable restriction may comprise a shuttle arranged with the two sides of the shuttle open to the pressure at the two sides of the further restriction respectively.

The shuttle may be in the leakage path, and may provide in combination with its cylinder the variable restriction.

In any of the above arrangements, there may be damping means so that the variation of the liquid resistance is arranged to lag the variation of the vehicle wheel speed.

The brake applying means may comprise a control valve arranged to progressively restrict the flow of liquid from the pump in a return line to the reservoir to increase the pressure in the connection to the brake operating means.

Reference is now made to the accompanying drawing which illustrates an embodiment of the present invention here given by way of example for an installation in connection with a wheel of a vehicle with a view to avoiding wheel lock on braking.

A brake pedal of the vehicle is indicated at 1 and this is connected through a link to a master cylinder of brake fluid shown at 3 which, on depression of pedal 1, pumps fluid through a line 2 to a cylinder 4. In the cylinder 4 there is a reciprocable valve member 5 in fluid tight relationship with the bore of the cylinder, and traversing the valve member 5 is an axial conduit 6 extending from the end of the member 5 adjacent line 2 and emerging into radial portions communicating with an annulus 7. The valve member 5 has a tapered portion 8 provided at its other end, there being a spring 9 housed in the end part of the cylinder 4 acting on the tapered portion 8 to urge the member 5 towards the other end of the cylinder. The annulus 7 co-operates, for a range of movement of the valve member 5, with a conduit 10 which leads to a further conduit 11 and thence to the brake circuit of a wheel 12.

A tank 13 containing brake fluid has a filter 14 disposed transversely across it. A pump 15, having a throughput substantially proportional to wheel speed and independent of output pressure over the operating speed and pressure range of the braking system, such as a transfer, piston or gear pump, is connected to the tank 13 drawing fluid from one side of the filter, and pumps fluid under pressure through conduit 16. The pump 15 is connected for rotation in dependence upon speed of rotation of wheel 12 and generates flow at the lowest rotational speeds of the wheel. A sensing restriction 17 in conduit 16 results in a differential pressure as between a conduit 18 and a conduit 19 connecting into the conduit 16 on each side respectively of the restriction 17, the conduits 18 and 19 being connected to each end respectively of a control valve device indicated at 20. The conduit 18 is provided with a restriction 36 — or an elongated restriction 34 as shown in the inset drawing — for a purpose described below. The conduit 19 leads to an axial bore 21 in a shuttle 22 housed in a sleeve member or housing in fluid tight relationship therewith.

Towards the right hand side of the shuttle 22 in the drawing there are tapered flats 23 providing a variable restriction as hereinafter described. A spring 24 biasses the shuttle 22 towards the right hand side of the sleeve member (in the drawing). The sleeve member has an annular groove 25 disposed part way between its ends, to which there is connected a conduit 26. In the conduit 26 there is indicated a restriction 27 which provides a main restriction as hereinafter described. With movement of the shuttle 22 to the left in the drawing there is a passage from conduit 19, through axial bore 21, thence past flats 23 to annular groove 25 and thence to conduit 26 through restriction 27. The conduit 28 connects back to the tank 13 on the other side of the filter 14. Connection is made from conduit 16 up through conduit 29 to the lower end of a cylinder 30 in which is located plug 31 biassed by a spring 32 to the position shown in the drawing. Conduit 29 is connectible with conduit 28 via conduit 33 in which latter conduit is located the tapered portion 8 and cylinder 4. When tapered portion 8 of valve member 5 does not obstruct conduit 33, i.e. before depression of, or on initial depression of brake pedal 1, the conduit 29 is in communication with the conduit 28. Beyond this initial range of depression, connection from conduit 33 to conduit 28 is obstructed at least in part by the tapered portion 8 of valve member 5. A relief valve device of conventional design is indicated at 35 and connects conduit 29 to conduit 28.

With the device mounted in a vehicle the pump 15 generates a flow in conduit 16 in dependence upon rotational speed of wheel 12. Depression of the brake pedal 1 initially results in fluid pressure from the master cylinder 3 being applied via conduit 6, annulus 7, conduit 10 to the conduit 11 and thence to the brake circuit of the wheel 12. This condition operates as long as annulus 7 co-operates with the conduit 10 i.e. for an initial range of movement of brake pedal 1 as mentioned above. During this initial range of movement of brake pedal 1, fluid fed to conduit 16 by pump 15 has a connection via conduit 29, conduit 33, to conduit 28, not being then obstructed by tapered portion 8, back to tank 13.

With an extent of depression for the brake pedal 1 beyond this initial range, the radial portions from the conduit 6 no longer co-operate with the conduit 10. Also the tapered portion 8 of the valve member 5 then at least partly obstructs the connection between conduit 33 and conduit 28. Fluid pressure then generated by the pump 15 in conduit 16 is applied via conduit 29, cylinder 30, to plug 31, which is displaced to pressurize the fluid in the brake circuit of the wheel 12 and thus apply the brakes. This generated pressure in conduit 28 can leak back via conduit 28 to tank 13 by virtue of the leak-off path provided through conduit 19. In this leak-off path back via conduit 19 there is a main restriction 27 and a variable restriction, past the tapered flats 23, in dependence upon the axial position of shuttle 22 in its housing. The variable restriction, created by the tapered flats 23 in variable communication with the annulus 25, is in series with the main restriction 27, in the leak-off path.

With high rotational wheel speeds a relatively high differential pressure is generated by pump 15 across restriction 17. High differential pressure forces shuttle 22 towards the left hand side of its housing and the relatively large extent of opening then provided by flats 23 in communication with annulus 25 renders the main restriction 27 relatively unaffected by the variable restriction, in series with it. At low rotational wheel speeds, the shuttle 22 is urged by the spring 24 towards the right since only a low differential pressure is generated across restriction 17. The variable restriction, in series with the main restriction 27 is then the dominant restriction and controls the leak-off path.

The response or movement of the shuttle 22 in its housing — to pressure changes caused by the differential pressure generated by restriction 17 — is controlled by the restriction 36 (or 34). During transient speed changes of the wheel — and hence the pump — the shuttle 22 is caused to take up positions which are at a variance with the steady state positions. This has the effect of changing the rate at which pressures in conduit 29 change.

The main restriction 27 can be incorporated into the sleeve member. The shuttle 22 and sleeve member in which it is housed can be disposed transversely or angularly with respect to the direction of travel of the vehicle to avoid acceleration effects on the operation of the shuttle 22.

It has been found that a combination of variable restriction and main restriction as hereinbefore described helps avoid lock of vehicle wheels and retention of braking performance over a range of wheel speeds, whereas the use of a fixed leak-off restriction tended towards avoidance of wheel lock rather at singular values of wheel speed.

The above described apparatus may be duplicated for each wheel of a vehicle, the pedal 1 and master cylinder 3 only being common to each system. Alternatively, the system may be applied to pairs of wheels. The pump 15 may be driven directly by a wheel, or by some other part of the transmission.

In the above described embodiment, the response of the shuttle 22 to changes in pressure across the restriction 17 is delayed by a restriction 36 or 34 in the conduit 18. Alternatively, the restriction 36 or 34 may be omitted, in which case the inertia of the shuttle itself causes sufficient delay to its response to the pressure across the restriction 17.

It will be appreciated that the effect of the damping means on the variable restriction will cause the restriction to close completely under steady state conditions at very low rotational speeds of the wheel, but under dynamic conditions — for instance if the wheel locks suddenly when braking — the restriction will not completely close to allow fluid leakage and thus at least partly release the brakes since the flow generated by the pump will have ceased.

I claim:

1. A braking system for a vehicle wheel, comprising;
   a. brake operating means;
   b. a reservoir for liquids;
   c. a pump having drive means which increases the pump throughput with increased wheel rotational speed;
   d. means to connect the pump input with the reservoir;
   e. a conduit connecting the pump output with the reservoir;
   f. a connection between the conduit and the brake operating means;
   g. brake applying means located downstream of the connection, and operable to add a restriction into the conduit so that the liquid pressure in the connection is increased;
   h. a leakage conduit arranged to bypass the brake applying means, which leakage conduit incorporates a variable restriction to provide a variable restriction to liquid flow and a fixed restriction in series with the variable restriction; and
   i. means to vary the variable restriction automatically with increased wheel rotational speed.

2. A braking system as claimed in claim 1 in which there is means to sense the throughput of the pump, which sensing means controls the means to vary the variable restriction.

3. A braking system as claimed in claim 2 in which the means to sense the throughput of the pump consists of a further restriction in the conduit upstream of the connection, and the varying means comprises a shuttle mounted in a cylinder and having two sides, each side being connected through further conduits to the pressure at the two sides respectively of the further restriction.

4. A braking system as claimed in claim 3 in which the shuttle is arranged in the leakage conduit, the shuttle in combination with its cylinder providing the variable restriction.

5. A braking system as claimed in claim 3 in which there is provided damping means arranged so that the variation of the variable restriction lags the variation of the vehicle wheel speed, which damping means comprises a damping restriction arranged in the further conduit between one side of the shuttle and the high pressure side of the further restriction, so that movement of the shuttle and hence the variation of the variable restriction lags the variation of the vehicle wheel speed.

6. A braking system as claimed in claim 1 in which the brake applying means comprise;
   a. a second liquid pump;
   b. a brake actuating member connected to the second pump so that movement of the member produces an output from the second pump;
   c. a control valve having a valve member progressively movable between two positions;
   d. a conduit connecting the output of the second pump to the control valve so that an output from the second pump moves the valve member;
   e. a first conduit through the control valve which first conduit connects the output of the second pump to the brake operating means when the valve member is in the first position; and
   f. means on the valve member to progressively restrict the conduit from the first-mentioned pump downstream of the connection as the valve member is moved progressively from its first position towards its second position.

7. A braking system for a vehicle wheel, comprising:
   a. brake operating means;
   b. a reservoir for liquids;
   c. a pump having drive means which increases the pump throughput with increased wheel rotational speed;
   d. means to connect the pump input with the reservoir;
   e. a conduit connecting the pump output with the reservoir;
   f. a connection between the conduit and the brake operating means;
   g. brake applying means located downstream of the connection, and operable to add a restriction into the conduit so that the liquid pressure in the connection is increased;
   h. a leakage conduit arranged to bypass the brake applying means, which leakage conduit incorporates a variable restriction to provide a variable restriction to liquid flow;
   i. means to vary the variable restriction automatically with increased wheel rotational speed; and
   j. damping means arranged so that the variation of the variable restriction lags the variation of the vehicle wheel speed.

* * * * *